United States Patent
Reed et al.

[15] 3,705,540
[45] Dec. 12, 1972

[54] ELECTRONIC FLASH UNIT

[72] Inventors: John M. Reed, Lexington; John M. Reynard, Framingham; Peter A. Scibilia, Franklin, all of Mass.

[73] Assignee: Polaroid Corporation, Cambridge, Mass.

[22] Filed: June 29, 1970

[21] Appl. No.: 56,079

Related U.S. Application Data

[63] Continuation of Ser. No. 745,813, July 18, 1968, abandoned.

[52] U.S. Cl................95/11.5 R, 240/1.3, 240/46.07
[51] Int. Cl..........................G03b 9/70, G03b 15/02
[58] Field of Search..........95/11 R, 11 L, 11.5 R, 45, 95/64 A; 240/1.3, 46.07, 46.09, 46.11

[56] References Cited

UNITED STATES PATENTS

| | | |
|---|---|---|
| 3,296,947 | 1/1967 | Engelsmann et al...........95/11.5 R X |
| 3,456,101 | 7/1969 | Rentschler et al................95/11 R X |
| 3,127,112 | 3/1964 | McCammom et al.................240/1.3 |
| 3,355,559 | 11/1967 | Hahn et al......................95/11.5 R X |
| 3,390,621 | 7/1968 | Land.....................................95/11 L |
| 3,491,667 | 1/1970 | Land....................................95/11 R |

*Primary Examiner*—Samuel S. Matthews
*Assistant Examiner*—Fred L. Braun
*Attorney*—Brown and Mikulka

[57] ABSTRACT

A photographic flash unit having a plurality of pivotable louvers mounted at the open face of the unit housing. The unit is provided with a mechanism for adjusting the position of the louvers to control the amount of light emitted by the unit during flash operation, and a mounting member for detachably connecting the flash unit to a camera. The unit also has a manually-operable trim device for producing an overall shift in the adjusting mechanism and subsequently in the degree of light output of the flash unit. The camera has a distance setting element which cooperates with the adjusting mechanism of the flash unit to vary the light output of the flash unit as a function of the distance of the subject from the camera. The manually-operable trim device permits the operator of the camera to produce an overall shift in the degree of light output of the flash unit at any given setting of the distance setting element of the camera.

32 Claims, 10 Drawing Figures

PATENTED DEC 12 1972
3,705,540
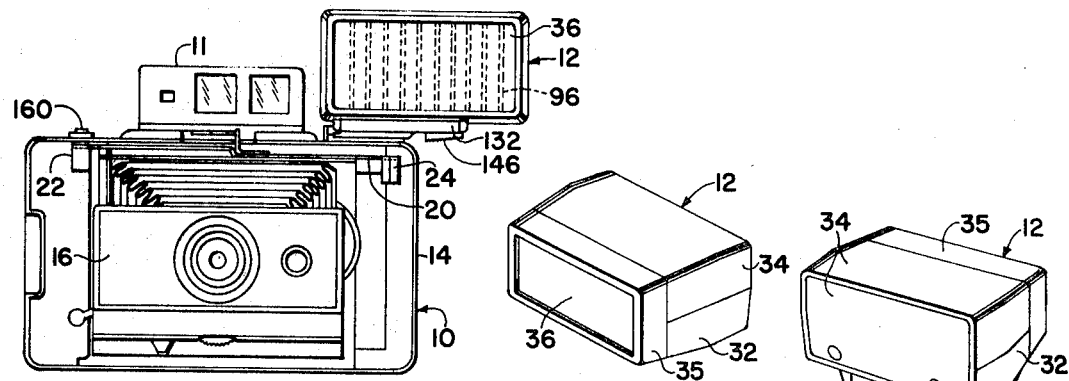
FIG. 1  FIG. 3  FIG. 4
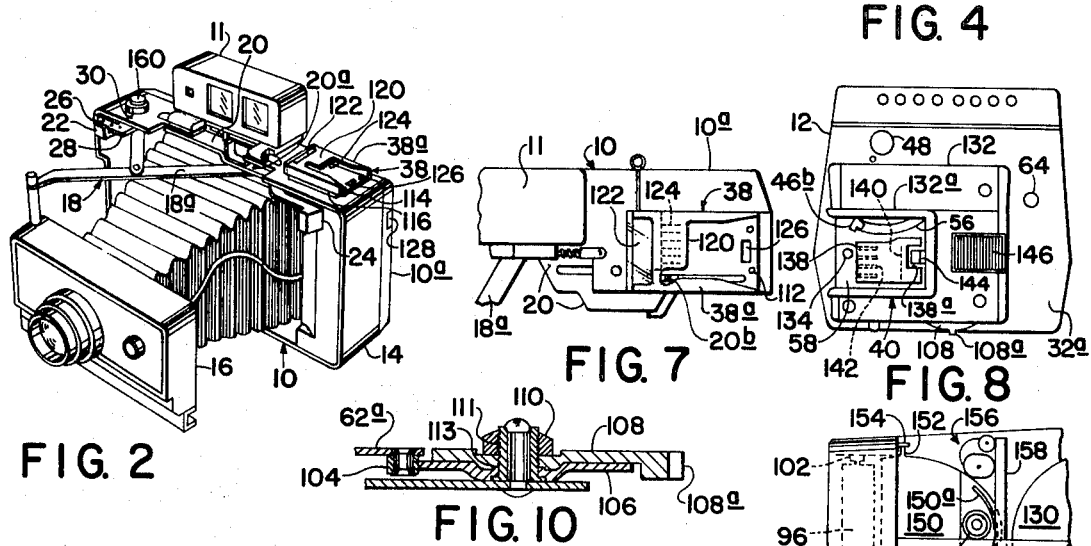
FIG. 2  FIG. 7  FIG. 8
FIG. 10  FIG. 6
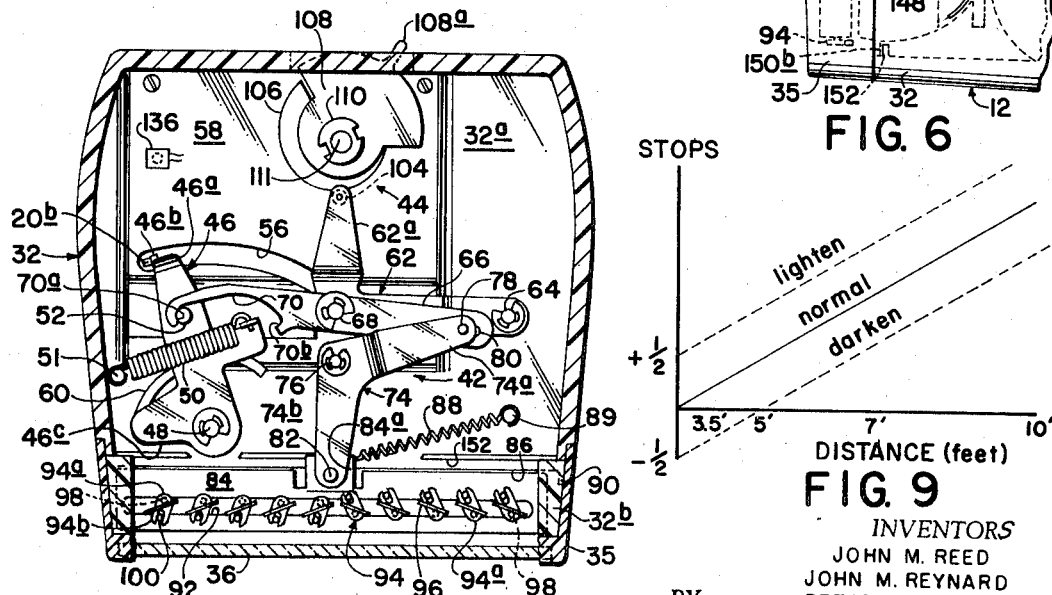
FIG. 5
FIG. 9
INVENTORS
JOHN M. REED
JOHN M. REYNARD
PETER A. SCIBILIA
BY Brown and Mikulka
ATTORNEYS 3,705,540

ELECTRONIC FLASH UNIT

This application is a continuation of my earlier application, Ser. No. 745,813, filed on July 18, 1968, now abandoned, and titled "Electronic Flash Unit."

The flash unit of the present invention includes a plurality of adjustable louvers disposed across its face which control the amount and direction of light emitted according to their rotational positions. The louvers are actuated through operation of a laterally-movable bar element to which they are attached through intermediate pivotal mounting means. The unit is especially adapted to incorporation with a camera of a type sold by Polaroid Corporation which employs so-called self-developing film units for producing a finished print immediately following a photographic exposure. The camera includes a linearly-movable focusing-bar employed, basically, to vary the position of an extensible front with respect to a focal plane. The focusing-bar serves also to actuate the follow-focus mechanism.

Through the medium of means comprising a plurality of cam, lever and associated components, linear movement of the camera focusing-bar is translated into predetermined rotational positions of the flash-unit louvers to vary the passage of light therebetween and provide an essentially correct illumination of the photographic subject at any of a plurality of given distance settings where, for example, a light from a conventional electronic flash unit may be too bright at, say, 3 feet and not bright enough at 10 feet. The cooperating trim components enable an overall shift of position of components of the primary follow-focus mechanism without affecting their interrelation to alter the illumination at any given setting thereof as may be desired. Thus, for example, a setting may be modified by the trim mechanism to voluntarily alter the exposure, e.g., to accommodate to some know peculiarity of film sensitivity; to satisfy a preference for a darker or a lighter print; to enable a slight increase of illumination range, or for some other reason.

Where the rule that the exposure should vary as the square of the distance from the light-source to the subject may be considered as reasonably accurate for outdoor flash photography, it is less so indoors. This is due to the various reflective surfaces present which, for instance, provide illumination of more distant objects and involve what may be termed the "scene effect." The flexibility of the subject apparatus is especially adapted to flash photography of the latter category.

In accordance with the foregoing considerations, objects of the invention are to provide a flash unit, the output of which functions automatically in response to a follow-focus mechanism and which is of relatively simple structure and positive in operation; to provide a flash unit of the type stated which is releasably mounted on a camera; to provide a unit of the character described which is in the form of an electronic flash unit; to provide an electronic flash unit in combination with a camera adapted to use a self-developing highly-sensitive type of film material, mechanism of the camera and flash unit cooperating to produce, automatically, a variation of light output for various distance settings of the camera; to provide an electronic flash unit incorporated with a camera in which the light output of the flash unit is varied in response to lateral linear movement of a focus-adjusting bar of the camera; to provide a flash unit as characterized which includes a manually-operable supplemental trim mechanism; to provide a trim mechanism utilizing substantially the entire follow-focus mechanism; to provide a trim mechanism including a cam and manually-actuatable lever means cooperating with the follow-focus mechanism for providing an adjustment of the flash-unit light output; to provide a flash unit as stated wherein a plurality of adjustable louvers together constituting a blind or shutter are positioned across a face thereof to control the amount and direction of light emitted so as to enable a light output which is correct for any distance within a given range, the louvers being actuated by focus-adjusting means of the camera in combination with mechanism of the flash unit; to provide a flash unit of the character described wherein the louvers direct portions of the emitted light laterally to each side; and to provide cooperating distance-setting and light-output-adjusting mechanism of a camera and electronic flash unit mounted thereon, wherein a mounting shoe of the camera includes a retaining element, a latch member, a plurality of electrical circuit contacts and a translationally-movable actuating component integral with the camera focus-adjusting means and protruding through a slot of the shoe, and wherein a mounting clip of the flash unit complementary to the shoe includes means engaging the retaining element of the shoe, a complementary latch member, a latch release means and means integral with and extending from the follow-focus mechanism for engaging the translationally-movable actuating component of the mounting shoe.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIG. 1 is a diagrammatic front-elevation view of a camera and electronic flash means of the invention;

FIG. 2 is a diagrammatic front perspective view of the camera illustrating the focusing linkage;

FIGS. 3 and 4 are diagrammatic front and rear perspective views, respectively, of the electronic flash unit;

FIG. 5 is a plan view of the follow-focus and trim mechanism; FIG. 6 is a fragmentary elevation view of the flash tube and reflector;

FIG. 7 is a fragmentary top view of the camera illustrating the mounting shoe for the electronic flash unit;

FIG. 8 is a diagrammatic plan view of the under side of the electronic flash unit showing the mounting clip;

FIG. 9 is a diagram graphically illustrating operation of the follow-focus and trim mechanism; and FIG. 10 is a fragmentary elevation view of means for adjusting settings of the trim mechanism.

Referring now to the drawing, in FIG. 1 a camera 10 embodying finder means 11 and the electronic-flash unit 12 of the invention is illustrated. The camera includes a back element 14 accommodating the film material and an extensible front 16. Extension of the camera front to a location identified with an infinity distance setting and its retraction to closed position are enabled through the linage 18. As illustrated more clearly in FIG. 2, means for extending and retracting the camera front 16 through an additional range of movement representative of distance settings closer than infinity include the horizontal slidably-movable, distance-adjusting or focusing bar 20, to which element 18a of the linkage is pivotally attached at 20a. The bar 20 includes a pair of manually-operable actuating buttons 22 and 24 at its extremities. Indicia 26, representing far, mid-range, and close distance settings, are inscribed on a plate 28 integral with and extending forwardly from the movable bar 20. The indicia 26 are positionable with respect to a fixed index mark 30 by pushing alternately upon the buttons 22 and 24 with the forefinger of each hand to effect a back-and-forth lateral movement of the bar 20. It is to be noted that relatively large increments of linear movement of the focusing bar are necessary to obtain initial changes of distance settings from approximately 3.5 feet and that relatively small increments of movement of the bar are necessary to obtain subsequent distance changes of equal footage, e.g., between 6 and 10 feet. An ear or lug 20b (FIG. 7), integral with and projecting upwardly from bar 20, provides an input to the follow-focus mechanism, to be described below.

The electronic flash unit, as further shown in FIGS. 1, 3 and 4, includes a basic housing portion 32 on or within which principal elements of the unit are mounted, a removable fitted housing portion 34, and a releasable frame or rim element 35. The housing is composed of a suitable somewhat resilient plastic material such as the acrylic a b s (acrylonitrile butadiene styrene). A light-transmitting panel 36, formed of a sheet of a plastic material, e.g., an acrylic which has been treated to render it predeterminedly light diffusing, is mounted across the front face of the unit. The diffusing characteristic is chosen to substantially eliminate vertical bands in the transmitted light. A mounting shoe 38 affixed to the camera is adapted to be releasably engaged by a mounting bracket or clip 40 of the flash unit.

The follow-focus mechanism 42 and cooperating trim mechanism 44 of the electronic flash unit are shown in detail in the sectional plan view of FIG. 5. The follow-focus mechanism comprises a lever 46 mounted for pivotal movement at 48 on the bottom wall or base 32a of the housing and biased for such movement in a given direction, namely, counterclockwise as shown in FIG. 5, by the extension spring 50 attached, respectively, to the lever and to fixed pin 51. The lever 46 includes a cam-actuating stud or pin constituting both a cam-follower and an input element 52 protruding from its face and an angular extremity 46a terminating in an engageable member 46b.

A curved slot 56 formed in a metallic mounting plate or insert 58 permits the angled portion 46a of the lever to move freely therewithin and to extend to the opposite side of the plate 58 at which location the member 46b is at a location for engagement by and movement with an actuating arm or lug 20b integral with and extending laterally from the camera focusing bar 20. A guide element 60 provides a bearing or supporting surface against which the inner surface of the lever portion 46c is adapted to move in slidable contact to facilitate an even rotation of the lever.

A right-angled arm member 62 is mounted for pivotal movement at 64 in underlying bearing means of the bottom wall 32a. An elongated arm 66 is mounted for rotation by pivotal means 68 at its approximate center or mid-point on the underlying apex of the angled arm 62. The apex portion of the arm 62 is free to undergo translational movement. A cam 70 of irregular or nonlinear contour is formed along an edge of arm 66 at one side of the pivotal means 68. A predetermined rotational movement of arm 66 is caused by movement of the actuating input pin 52 along the cam surface 70. The limits of movement of pin 52 along the cam surface 70. The limits of movement of pin 52 along the cam surface are established by the projecting limit-stop portions 70a and 70b of the arm. The pin 52 is normally biased against the limit-stop 70a by an extension spring 72, thus bringing the lever 46 to the position of extreme counterclockwise movement shown.

A bell-crank 74 is mounted for pivotal movement at 76 in underlying bearing means of the bottom wall 32a. An extremity of one arm 74a of the bell-crank is attached for rotational and slidable movement to an end of arm 66 opposite to that at which cam 70 is located by a pin 78 projecting downwardly within a slot 80. An extremity of the other arm 74b of the bell-crank is attached for rotational movement at 82 to an appendage or tab 84a of an elongated bar element 84, the latter being mounted for slidable movement back-and-forth in a depressed guide or channel 86 formed within the bottom wall 32a and extending into side-wall portions 32b. The bell-crank 74 is biased for counterclockwise rotation by an extension spring 88 attached, respectively, to the piece 84a and to fixed pin 89. The limit of linear movement of the bar element 84 in one direction, namely, to the left as illustrated, is established by contact of pin 52 with the cam limit-stop 70a. The extent of its movement in an opposite direction is determined by contact of the right-hand end of the bar element 84 with a limit-stop projection 90. It is to be noted that the bar element 84 includes an elongated generally-central slot 92 extending longitudinally thereof which permits, within its confines, unobstructed access to the bottom wall 32a.

A plurality of pivotal yoke-like support elements 94, each serving to mount the lower or bottom end of one of the louvers 96 which together form the blind or screen, are adapted to be actuated for rotation through the aforesaid movement of the bar element 84. The louvers, composed, for example, of a white-coated metal, are fixedly attached to approximate mid-points of the support elements 94, as by the insertion of their narrowed extremities within slots formed in the elements 94. At one end 94a of each support element 94 is an integral downwardly projecting pin 98 which is rotatably mounted in an underlying circular perforation formed in the bottom wall 32a of the flash unit in the area of the slot 92. The other end of each support element 94 is in the form of a yoke 94b of a given length which so engages a fixed pin 100, integral with and extending upwardly from the surfaces of the bar 84, as to permit rotation of the support element 94 about the pin 100 and such slight longitudinal movement as may be necessary to prevent binding when the bar 84 is moved back and forth. The opposite or upper ends of the louvers are mounted for an identical rotational movement in a plurality of support elements 102 of generally similar structure but which are not driven.

Completing the device illustrated in FIG. 5, is the cooperating "trim" mechanism 44, the operation of which as well as that of the follow-focus mechanism, will be described in detail hereinafter. The trim mechanism comprises lever 62, already describer as an element pivotally carrying the arm 66. More particularly, the trim mechanism includes the angular lever portion 62a. A pin 104 extends downwardly from the tip of the latter. A cam 106, having a constantly-varying or regular profile, is so mounted for rotation on the supporting plate 58 as to bear against the pin 104 and, when rotated, to bodily move the pin so as to produce rotation of lever 62 about the pivot 64. The arm 66 is thereby moved translationally because of its pivotal connection with lever 62 at 68. The cam 106 is subject to manual rotation by a disk or sector component 108 having an actuating knob 108a formed, for example, of a plastic composition and held in frictional engagement with the cam by a nut 110.

The mounting shoe 38 of the camera 10 and the complementary clip 40 of the flash unit 12 which engages the shoe are illustrated in detail in FIGS. 2, 7 and 8. The shoe 38 is attached to the camera, as by the screws 112, and includes an underlying spacer component 114 of smaller dimensions providing an undercut area 116 along its sides beneath the overturned metallic flange portions 38a. The lug 20b protrudes upwardly from the integral focusing bar 20 through a linear slot 118 which permits it to move freely in response to movement of the focusing bar during manual actuation of the buttons 22 and 24. Partially visible and partially underlying a metallic cap member 120 unitary with the side portions 38a, is a male electrical connector 122 including six contacts or pins indicated at 124. The four central contacts are employed with a mating connector component of the clip 40 in the electronic flash circuit; the two outside contacts are for use with a connector clip of a battery-charging unit adapted to engage the shoe 38. A small rectangular aperture 126 forms a latch component cooperating with latching means of the flash unit. A low voltage battery, e.g., a 2.4 volt nickel cadmium battery and a converter component comprising, for example, oscillator and transformer means for increasing the voltage and charging a flash condenser are contained within the camera housing, access thereto being provided by a pivotal housing section 10a. An indicating light 128 shows the charged condition of the flash condenser 130 housed in the flash unit (FIG. 6).

The clip 40 of the electronic flash unit 12 is, in part, embodied in a cover-plate 132 fastened to the bottom wall 32a of the flash unit and having overturned flange portions 132a. These flange portions are adapted to be slipped over and retain the flange portions 38a of the camera shoe, as permitted by the undercut areas 116 of the latter. The inner plate 58, also attached to the bottom wall 32a as shown from the other side in FIG. 5, includes the curved slot 56 through which the input member 46b of the follow-focus mechanism extends. Plate 58 also includes slightly raised linear portions or beads (not shown) underlying the overturned cover-plate portions 132, the beads cooperating with the latter in slidably accepting the cameral shoe. A perforation in plate 58 permits a spring-biased ball component 134 of a safety switch 136 mounted on the other side of the plate to protrude therethrough.

The clip 40 further includes a generally-central metallic platform 138 having a cut-out portion 138a fixedly attached to plate 58. A female electrical connector or socket 140 having four contacts indicated at 142 is mounted on the under surface of platform 138. These contacts are adapted to accept the four central electrical contact pins 124 of connector 122 of the camera shoe. Completing the clip element are the latch 144 which is spring-biased outwardly of the plane of the platform 138 for entrance into aperture means 126 of the shoe to lock the clip and shoe together when joined, and the button 146 for manually releasing the latch 144 from the aperture to remove the flash unit from the camera.

Again referring to FIG. 6, the flash unit is shown from one side with the housing portion 34 removed. The high voltage flash tube 148, an end only being shown, is mounted transversely across the inner surface of the reflector 150, the latter including a high-reflectance metal insert 150a adapted to tolerate extreme heat. A plurality of flanges 150b of the reflector at top and bottom of the reflector are inserted in a transverse groove 152 formed in the bottom wall 32a of the unit and are frictionally held at lip 154 for releasably mounting the reflector and components integral therewith. The electrical components for generating the electronic flash, while not forming a part of the present invention, include the aforementioned flash condenser 130, and such additional resistor and capacitor components, indicated at 156 and mounted on a supporting panel 158 attached to reflector 150, as are functionally required for triggering and other related purposes. The follow-focus mechanism, not shown in FIG. 6, is located beneath the elements shown, in the lower portion of the housing.

It is to be understood that a conventional arrangement of switch contacts to provide a correct energization of the flash circuit are identified with the camera shutter and that the shutter release 160 of the camera is used for both normal and flash exposures. An on-off switch 162 determines the mode of operation. When the flash unit clip 40 engages the camera shoe 38, the small ball component 134 of switch 136 is pressed inwardly due to contact of the surface of cap member 120 therewith. The switch 136 at this position permits a functional discharge of the flash condenser. When the flash unit is removed from the camera, ball component 134 springs outwardly closing a resistor circuit whereby a charge on the flash condenser is dissipated, without danger to the operator. In conjunction with the foregoing movements, it is to be understood that the irregular contour of the cam 70 is of a predetermined nature such as to provide a relatively small rotation of the arm 66 responsive to an initial comparatively large linear movement of the focusing bar 20 and relatively greater rotations of the arm 66 for successively smaller linear movements of the focusing bar. A correct relation of camera distance settings and light output is thus obtained through this differential characteristic of the mechanism. More particularly this differential is produced between the input and output extremities of the arm 66.

Operation of the follow-focus and trim mechanisms 42 and 44 of the flash unit is as follows. As previously stated, lateral movement of the focusing bar 20 of the camera, performed by alternately manually pressing the buttons 22 and 24, moves the camera front 16 in and out thus adjusting for distance. Assuming the input actuating lug or tab 20b of the focusing bar to be at the position shown in FIGS. 5 and 7, the distance setting of the camera is for an extreme nearness of the photographic subject.

At the above-described location of lug 20b, lever 46, biased by extension spring 50, is at a position of extreme counterclockwise rotation about pivot 48 at which the input pin 52 is held by the overturned cam portion 70a. The arm 66, as determined by the cam surface 70, is at a position of extreme clockwise rotation about pivot 68. The bellcrank 74 is at a position of maximum clockwise rotation against the bias of extension spring 88 about pivot 76, as provided by engagement of pin 78 in slot 80. The elongated bar element 84, pivotally connected to the bellcrank at 82 and slidably mounted in channel 86, is at its extreme position in one direction, to the left as illustrated. The five right-hand support elements 94 are at their positions of maximum counterclockwise rotation, while the five left-hand support elements 94 are at their positions of extreme clockwise rotation. The assemblages of louvers have thus been automatically rotated to their effectively "closed" positions involving the establishment of minimum light-transmitting apertures therebetween. Accordingly, the light output of the electronic flash unit is at a minimum consistent with an extreme closeness of the photographic subject. At the effectively closed position, the louvers provide the equivalent of approximately 3.1 stops attenuation. It is to be noted that the angular disposition of the louvers is such as to direct light incident thereupon outwardly to the sides, exclusive of the central rays. This is made possible by the structure which provides an opposite rotation of each bank of five louvers responsive to movement of the bar element 84 in a single direction.

Let it now be assumed that the distance from the camera to a photographic subject is greater than that initially stated. The lug 20b of the focusing bar 20 is moved to the right as illustrated in FIGS. 2, 5 and 7. The camera front 16 is thus moved retractably diminishing the distance from lens to focal plane. The member 46b is pushed to the right by lug 20b. Accordingly, lever 46 is pivoted in a clockwise direction; the input pin 52 rides along cam surface 70 which is biased thereagainst by extension spring 88; arm 66 rotates in a counterclockwise direction causing a similar rotation of bellcrank 74; and the bar element 84 is moved to the right. These operations produce a clockwise rotation of the five right-hand louvers 96 and a counterclockwise rotation of the five left-hand louvers 96. Assuming the foregoing movement of components to their extreme positions, that is, in response to movement of the focusing bar 20 to a distance setting which is a practical maximum for the contemplated flash photography such as one for 10 feet, the louvers 96 are brought to their wide-open positions. This condition is established when the right-hand end of bar 84 is in contact with the limit stop 90.

AS previously intimated, it may be desirable to alter the light output of the flash unit rapidly and easily to lighten or darken a photographic print because of some unusual factor affecting its density or other property. This is accomplished through manipulation of the trim mechanism 44, the lever component 62 of which has already been mentioned as providing a pivotal mounting for the arm 66 of the follow-focus mechanism.

The pin 104 is always maintained in firm contact with the surface of cam 106, whatever the position of the follow-focus components and the rotational position of cam 106. This is insured by the structure providing a substantially in-line relation of input, pivot and output points of the arm 66 at 52, 68 and 78, respectively; by the pivotal mounting of lever 62 and 64; by the translational mobility of the pivot 68 at the apex of lever 62, and by the biasing force exerted by the spring 88. The aforesaid in-line relation of points also insures a substantial identical movement at output point 78 for both follow-focus and trim operations.

When the lever or handle 108a is turned manually in a counterclockwise direction by way of example, as shown in FIG. 5, the increasing radius of cam 106, bearing against pin 104, forces pivot 68 downwardly and slightly arcuately. Arm 66 pivots on pin 52, at whatever bearing point the cam surface happens to have established at the moment. The in line relation of points 52, 68 and 78 is substantially maintained. Bellcrank 74 is thereby caused to rotate in a clockwise direction rotating the louvers 96 to a less-open position, thus diminishing the the light output of the flash unit, and, accordingly, lessening the exposure and darkening the print density, overall. An opposite rotation of the lever 108a produces an operation which is the reverse of the above described.

The capability of the trim mechanism to alter or shift the overall light output of the flash unit is graphically represented in FIG. 10. Through a distance of from 3.5 feet to 10 feet, inclusive, a range of louver opening variation equivalent to an exposure variation of from − ½ to + ½ stops is indicated. A rotation of the cam 106 by 30° in either direction from a neutral position produces the aforesaid stop variation.

If for any reason the rotational position of the cam 106 with respect to the disk component 108 requires adjustment, e.g., to obtain the aforesaid range of stop variation, means for the purpose are illustrated in FIG. 10. By loosening the nut 110 on the threaded post 111, the relative rotational positions of the cam 106 and disk 108 may be altered. Scored surface areas of the cam at 113 contribute to retain the cam and disk at adjusted positions.

Since certain changes may be made in the above apparatus without departing from the scope of the invention herein involved, it is intended that all matter contained in the above description or shown in the accompanying drawing shall be interpreted as illustrative and not in a limiting sense.

We claim:

1. An electronic flash unit for attachment to a camera having distance - setting means to provide both a variation of light output responsive to said distance-setting means of the camera and, optionally, an overall shift in light output at any stage of said variation, said flash unit comprising a housing having an open face with a light-transmitting panel positioned thereacross, means for releasably attaching said housing to said camera, a flash tube, reflector and associated electronic components for providing in conjunction with shutter switch-contact means and shutter-release means of the camera an electronic flash of given characteristics, a plurality of pivotal louvers mounted at said open face of the housing between said flash tube and said light-transmitting panel, a follow-focus mechanism actuatable by said distance-setting means of the camera for rotating said louvers by given amounts with respect to given increments of movement of said distance-setting means to produce given variations of light output of said flash unit, said follow-focus mechanism including a pivotal and translationally-movable member providing an input and an output differential, and a manually-operable trim mechanism cooperating with said translationally-movable member of the follow-focus mechanism for bodily moving said member to provide an overall shift in the degree of light output of the flash unit at any setting of said distance-setting means.

2. An electronic flash unit, as defined in claim 1, wherein said panel possesses a light-diffusing property.

3. An electronic flash unit, as defined in claim 1, wherein said distance-setting means of the camera is a manually-operable, linearly-movable focus-adjusting bar and said follow-focus mechanism includes arcuately-movable means interconnecting said focus-adjusting bar and said pivotal and translationally-movable member.

4. An electronic flash unit, as defined in claim 3, wherein said pivotal and translationally-movable member is in the form of an elongated arm having a cam surface of irregular contour formed at one end thereof, and wherein a lever component of said follow-focus mechanism including a projecting pin adapted to move along said cam surface is directly actuatable by means integral with said focus-adjusting bar of the camera.

5. An electronic flash unit, as defined in claim 3, wherein said louvers are fixedly attached at their extremities to a plurality of yoke-like support elements each of which is pivotally mounted at one end on a wall of said housing and pivotally connected at an opposite end to a slidable bar element of said follow-focus mechanism.

6. An electronic flash unit, as defined in claim 5, wherein said louvers comprise two assemblages thereof adapted to rotate in opposite directions responsive to linear movement of said bar element, the louvers of each assemblage being equal in number and so oppositely angularly adjustable as to reflect portions of the light from said flash tube which are incident thereupon outwardly toward the sides of a field of illumination.

7. An electronic flash unit, as defined in claim 2, wherein said louvers are mounted vertically across said open face and the diffusing property of said panel is of a degree adapted to substantially eliminate the photographic perceptibility of shadows cast by said louvers.

8. An electronic flash unit, as defined in claim 1, wherein said means for attaching said flash unit housing to the camera is in the form of a clip element comprising a plurality of engaging flange members, latch-fastening, and release means, movable means integral with an input component of said follow-focus mechanism, and a plurality of electrical contact means, said flange members and said release means being adapted to mate with complementary means of a shoe fixed to the housing of the camera.

9. An electronic flash unit for attachment to a camera to provide, automatically, a predetermined variation of light output thereof responsive to a linearly-movable focus-adjusting element of the camera, said flash unit comprising a housing having an open face with a light-diffusing panel positioned thereacross, means for releasably attaching said flash unit to complementary attaching means of the camera, a flash tube, reflector, and associated electronic components for providing in conjunction with electronic and shutter-release means of the camera a flash of given characteristics, a plurality of louvers fixedly mounted top and bottom in a plurality of pivotal yoke-like supports at said open face of the housing between said flash tube and said light-diffusing panel, and a follow-focus mechanism actuatable by said focus-adjusting element for rotating said louvers by given amounts with respect to given increments of linear movement of said element to produce variations of light output of said flash unit, said follow-focus mechanism including a first lever engageable by a tab integral with said camera focus-adjusting element and having a pin projecting from a face thereof for use as an input means, an extension spring biasing said lever into engagement with said tab, a second lever, an elongated arm having an irregular cam surface formed at one end pivotally mounted on an arcuately-movable portion of said second lever, a bellcrank having one appendage pivotally-connected to the other end of said arm, the other appendage of said bellcrank being pivotally-connected to a bar slidably-mounted in channel means across said open face of the housing and adapted to engage and produce rotation of said louver supports, spring means for biasing said bellcrank toward rotation in a given direction and thereby respectively biasing said cam surface of said arm against said pin of said first lever, said other end of said arm in a given direction and said bar toward one end of said channel means to provide a given degree of rotation of said louvers in one direction, movement of said bar and louvers in opposite directions being produced by movement of said focus-adjusting element in a direction opposite to that providing rotation of said louvers in said one direction.

10. An electronic flash unit, as defined in claim 9, wherein said irregular cam surface is of a contour adapted to provide differential input and output increments of movement.

11. An electronic flash unit, as defined in claim 10, wherein the limit of movement of said slidably-mounted bar in one direction is established by an overturned end of said arm at an extremity of said cam surface thereof in engagement with said pin of said first lever and in an opposite direction by limit stop means integral with said housing in engagement with a portion of said bar.

12. An electronic flash unit, as defined in claim 10, wherein said louvers consist of two assemblages adapted to rotate in opposite directions and to assume angular positions adapted to conduct portions of said light output outwardly to the sides of a field of illumination.

13. An electronic flash unit, as defined in claim 12, wherein said yoke-like supports are pivotally connected at one end to wall portions of said flash unit housing and at the other end to said slidably-mounted bar.

14. An electronic flash unit for attachment to a camera to provide, automatically, both a predetermined variation of light output thereof responsive to a linearly movable focus-adjusting element of the camera and, optionally, an overall shift in the degree of light output at any stage of said variation, said flash unit comprising a housing having an open face with a light-diffusing panel positioned thereacross, means for releasably attaching said flash unit to complementary attaching means of the camera, a flash tube, reflector, and associated electronic components for providing in conjunction with electronic and shutter-release means of the camera a flash of given characteristics, a plurality of louvers fixedly mounted top and bottom in a plurality of pivotal yoke-like supports at said open face of the housing between said flash tube and said light-diffusing panel, a follow-focus mechanism actuatable by said focus-adjusting element for rotating said louvers by given amounts with respect to given increments of linear movement of said element to produce variations of light output of said flash unit, said follow-focus mechanism including a first lever engageable by a tab integral with said camera focus-adjusting element and having a pin projecting from a face thereof for use as an input means, an extension spring biasing said lever into engagement with said tab, a second lever, an elongated arm having an irregular cam surface formed at one end pivotally mounted on an arcuately-movable portion of said second lever, a bellcrank having one appendage pivotally-connected to the other end of said arm, the other appendage of said bellcrank being pivotally connected to a bar slidably-mounted in channel means across said open face of the housing and adapted to engage and produce rotation of said louver supports, spring means for biasing said bellcrank toward rotation in a given direction and thereby respectively biasing said cam surface of said arm against said pin of said first lever, said other end of said arm in a given direction and said bar toward one end of said channel means to provide a given degree of rotation of said louvers in one direction, movement of said bar and louvers in opposite directions being produced by movement of said focus-adjusting element in a direction opposite to that providing rotation of said louvers in said one direction, and a manually-operable trim mechanism cooperating with said second lever of the follow-focus mechanism for bodily moving said elongated arm mounted thereon to provide said overall shift in the degree of light output of the flash unit at any setting of said focus-adjusting element of the camera.

15. An electronic flash unit, as defined in claim 14, wherein said second lever comprises a pair of angularly-disposed members joined to form an apex, one of which members is pivotally mounted at its extremity, said elongated arm being pivotally mounted on said second lever at said apex so as to be translationally movable therewith.

16. An electronic flash unit, as defined in claim 15, wherein the other of said angularly-disposed members of said second lever includes a stud adjacent to its extremity and normal to its face, and wherein said trim mechanism includes a rotatable cam of regular profile and actuating means therefor extending through and exteriorly of said housing for manual operation, said stud being biased against the surface of said last-named cam by said spring means in cooperation with the other components of said follow-focus mechanism, rotation of said cam producing, respectively, an arcuate movement of said second lever, both a translational and pivotal movement of said elongated arm mounted thereon, a pivotal movement of said bellcrank, a linear movement of said bar, and rotation of said louvers.

17. An electronic flash unit, as defined in claim 16, wherein rotational adjustment of said cam of the trim mechanism by approximately 30° to either side of a reference position provides a variation of the light output equivalent in terms of exposure to approximately — ½ and + ½ stop.

18. An electronic flash unit, as defined in claim 17, wherein the defined structure of said first lever and input pin thereof, and that of said elongated arm and irregular cam surface thereof and its pivotal connection to said second lever for translational movement, when taken with said structure and adjustment of the trim mechanism, provides that a substantially in-line relation exists during said adjustment between said input pin at given portions of said irregular cam surface, the pivot connecting said elongated arm to said second lever, and the pivot connecting said elongated arm to said bellcrank.

19. An electronic flash unit, as defined in claim 16, wherein said cam of regular profile and said actuating means therefor are rendered relatively rotationally adjustable by a shaft including both bearing and threaded portions, a nut in releasable engagement with said threaded portions, and contiguous surfaces of said cam and actuating means adapted to frictional contact, said cam and said actuating means being adapted to rotation at said bearing portions.

20. A flash unit for a photographic camera to provide both a variation of light output responsive to camera-to-subject distance and a selective adjustment in light output at any particular camera-to-subject distance, said flash unit comprising a housing having an opening, means for attaching said housing to a camera, a reflector facing said opening, means for mounting a light source cooperatively with said reflector to direct light through said opening, a plurality of pivotal louvers mounted at said opening of the housing opposite said light source and said reflector, a distance-setting mechanism actuatable in accordance with the camera-to-subject distance for rotating said louvers by given amounts to produce given variations of light output of said flash unit, said distance-setting mechanism including differential means providing an input and an output differential, and a manually-operable trim mechanism cooperating with said differential means for adjusting said differential means to provide an overall adjustment in the light output of the flash unit at any particular setting of said distance-setting mechanism.

21. An electronic flash unit for attachment to a camera to provide, automatically, a predetermined variation of light output thereof responsive to distance-setting means of the camera, said flash unit comprising a housing having an open face with a light-diffusing panel positioned thereacross, means for releasably attaching said housing to said camera, a flash tube, reflector and associated electronic components for providing in conjunction with shutter switch-contact and shutter-release means of the camera an electronic flash of given characteristics, a plurality of pivotal louvers mounted at said open face of the housing between said flash tube and said light-diffusing panel, and a follow-focus mechanism actuatable by a linearly-movable focus-adjusting bar of the camera for rotating said louvers by given amounts with respect to given increments of linear movement of said focus-adjusting bar to produce variations of light output of said flash unit, said follow-focus mechanism including a pivotal and translationally-movable arm member having a cam surface of irregular contour formed at one end thereof providing an input and an output differential of functional movement responsive to a cam-follower element actuated by said linearly-movable focusing bar of the camera and adapted to move along said cam surface.

22. An electronic flash unit for use with a camera of a type adapted to expose and process self-developing film material which includes a back, an extensible front, a linkage and bellows interconnecting said back and front, a laterally and linearly movable focus-adjusting bar pivotally connected to said linkage for moving said camera front relative to a focal plane and manually-actuatable by a pair of buttons positioned at each end thereof, a small tab integral with and projecting outwardly from said focus-adjusting bar adjacent to one end thereof, and a mounting shoe adapted for releasable engagement by a mating elements of said electronic flash unit, the shoe including an elongated slot for projection of said tab therethrough, a plurality of engageable flanges, a latch component, and electrical connector means, said electronic flash unit being adapted to provide a predetermined variation of its light output responsive to linear movement of said focus-adjusting bar and comprising a housing having an open face with a light-diffusing panel positioned thereacross, a mounting clip for releasably engaging the mounting shoe of said camera, the clip including a plurality of gripping flanges, a curved slot, a latch component, and electrical connector means mating with that of the camera shoe, a flash tube, reflector and associated electronic components for providing in conjunction with shutter switch-contact means and shutter-release means of the camera an electronic flash of given characteristics, a plurality of pivotal louvers mounted at said open face of the housing between said flash tube and said light-diffusing panel, a follow-focus mechanism actuatable by said focus-adjusting bar of the camera for rotating said louvers by given amounts with respect to given increments of movement of said distance-setting means to produce given variations of light output of said flash unit, said follow-focus mechanism including an arcuately-movable member projecting through said curved slot of said mounting clip, a pivotal and translationally-movable member providing an input and an output differential, and a manually-operable trim mechanism cooperating with said translationally-movable member of the follow-focus mechanism for bodily moving said member to provide an overall shift in the degree of light output of the flash unit at any setting of said focus-adjusting bar of the camera.

23. A pair of complementary mounting brackets integral, respectively, with a camera of a type having a linearly-movable bar for manually-adjusting distance settings and an electronic flash unit having a follow-focus mechanism, responsive to movement of said bar, said camera bracket comprising a metallic body including, in unitary relation, a base, a cap and a pair of overturned flange members, a spacer providing undercut areas along the sides of said flange members, an elongated slot formed in said base, a latch component, electrical connector means underlying said cap, and a tab integral with said linearly-movable bar projecting through said slot for longitudinal movement therein during movement of said bar, and said bracket of the electronic flash unit comprising a metallic body including, in unitary relation, a base, a generally centrally-located platform, a pair of overturned flange members adapted to engage said flange members of the camera bracket, an arcuate slot formed in said base, a latch component, electrical connector means underlying said platform adapted to mate with those of the camera bracket, electrical safety switching means operable through contact with the camera bracket, and a tab integral with an input component of said follow-focus mechanism projecting through said arcuate slot for contact with and arcuate movement responsive to linear movement of said tab of said bar.

24. Photo-flash modulation apparatus for use with a camera having focus adjusting means, including:
 a support;
 receiving means connected to said support for securing a lamp to illuminate a subject;
 means operably connected to said focus adjusting means and disposed between said receiving means and said subject for selectively transmitting a predetermined portion of the illumination from said lamp to said subject as a function of the focus setting of said camera; and
 means functionally independent of said focus adjusting means and operably connected to said transmitting means for selectively controlling the intensity of the illumination reaching said subject from said lamp.

25. The invention as recited in claim 24, wherein said transmitting means includes shutter means and said functionally independent means includes means connected to said shutter means for selectively controlling same independent of said focus adjusting means.

26. The invention as recited in claim 25, wherein said transmitting means includes first cam means interposed between said focus adjusting means and said shutter means; and wherein said functionally independent means includes second cam means connected to said shutter means.

27. Flash apparatus for a photographic camera for providing both a variation of light output responsive to camera-to-subject distance and a selective adjustment in light output at any particular camera-to-subject distance, said apparatus adapted to receive a housing having a window, including:
 light source receiving means connected to said housing;
 shutter means disposed outward of said light source receiving means and defining said window;

distance setting means actuable in accordance with the camera-to-subject distance for actuating said shutter means and thereby selectively blocking portions of the illumination from a light source in said receiving means by varying the size of said window, said distance setting means including differential means having an input and an output differential; and a manually-operable trim mechanism cooperable with said differential means for adjusting said differential means to provide an overall adjustment in the light output of the flash apparatus at any particular setting of said distance setting means.

28. The invention as set forth in claim 27, wherein said shutter means includes plural light blocking leaves and means interconnecting same in variable spaced relation such that the window defined thereby varies as a function of camera-to-subject distance.

29. The invention as set forth in claim 28, with said plural light blocking leaves comprising a plurality of pivotal louvers connected to said housing and further including a follow-focus mechanism actuable by a linearly movable focus-adjusting bar for rotating said louvers by given amounts with respect to given increments of linear movement of said focus-adjusting bar to produce variations of light output from said flash apparatus.

30. Apparatus adapted for use with a camera having focus-adjusting means, for modulating the illumination reaching a subject from a light source in accordance with the range of said subject with respect to said camera, including:

shutter means for blocking a variable portion of the illumination from said light source;

distance setting means actuable in accordance with said range for actuating said shutter means and thereby selectively blocking portions of the illumination from said light source, said distance setting means including differential means having an input and an output differential; and a manually-operable trim mechanism cooperable with said differential means for adjusting said differential means to provide an overall adjustment in the light output of the flash apparatus at any particular setting of said distance setting means.

31. The invention in accordance with claim 30, wherein said shutter means includes plural light blocking leaves and means interconnecting same in variable spaced relation such that the net aperture thereby defined varies as a function of said range.

32. The invention according to claim 31, with said plural light blocking leaves comprising a plurality of pivotal louvers connected to said housing and further including a follow-focus mechanism actuable by a linearly movable focus-adjusting bar for rotating said louvers by given amounts with respect to given increments of linear movement of said focus-adjusting bar to produce variations of light output from said flash apparatus.

* * * * *